United States Patent
Horoschenkoff et al.

(10) Patent No.: US 6,321,660 B1
(45) Date of Patent: Nov. 27, 2001

(54) VEHICLE CELL

(75) Inventors: Alexander Horoschenkoff, Taufkirchen; Peter Scheid, Peissenberg; Wolfgang Schähl, Henningsdorf; Thomas Fretwurst, Berlin, all of (DE)

(73) Assignee: DaimlerChrysler Rail Systems GmbH (DE)

( * ) Notice: Subject to any disclaimer, the term of this patent is extended or adjusted under 35 U.S.C. 154(b) by 0 days.

(21) Appl. No.: 09/367,792

(22) PCT Filed: Nov. 25, 1998

(86) PCT No.: PCT/EP98/07596

§ 371 Date: Oct. 25, 1999

§ 102(e) Date: Oct. 25, 1999

(87) PCT Pub. No.: WO99/32341

PCT Pub. Date: Jul. 1, 1999

(30) Foreign Application Priority Data

Dec. 22, 1997 (DE) .............................................. 197 57 204

(51) Int. Cl.[7] .................................................. B61D 17/00
(52) U.S. Cl. ............................................................ 105/397
(58) Field of Search .................................. 105/397, 401, 105/238.1, 396

(56) References Cited

U.S. PATENT DOCUMENTS

| 5,042,395 | * | 8/1991 | Wackerle et al. | 105/397 |
| 5,059,056 | | 10/1991 | Banthia et al. | 403/170 |
| 5,458,066 | * | 10/1995 | Ishida et al. | 105/401 |
| 5,857,414 | * | 1/1999 | Thoman et al. | 105/397 |

FOREIGN PATENT DOCUMENTS

| 83378 | 3/1895 | (DE) . |
| 0602259 | 6/1994 | (EP) . |
| 0697318 | 2/1996 | (EP) . |

* cited by examiner

Primary Examiner—S. Joseph Morano
Assistant Examiner—Robert J. McCarry, Jr.
(74) Attorney, Agent, or Firm—Webb Ziesenheim Logsdon Orkin & Hanson, P.C.

(57) ABSTRACT

A vehicle cell with side walls that consist of a plurality of wall segments 2 that are joined together laterally in the longitudinal direction of the vehicle has door openings to make possible an advantageous construction concept that employs simple means, wherein the side wall segments 2 that are adjacent to one another laterally have, in the vicinity of their facing vertical lateral edges 2.1, door partial cutouts 4 which, when the segments are combined with one another, form a full-width door.

20 Claims, 2 Drawing Sheets

VEHICLE CELL

BACKGROUND OF THE INVENTION

1. Field of the Invention

This invention relates to a vehicle cell, particularly a car body for a railway vehicle.

2. Description of the Prior Art

On a similar vehicle cell of the prior art (DD 83378) that is realized in the form of a car body for railway vehicles, the roof and side walls are each formed from a plurality of wall elements that are joined together in the longitudinal direction of the vehicle. There is a door opening in one segment of the assembled side wall. The walls themselves are realized in a sandwich structure with two outer layers, between which there is an insulating core material, and in the peripheral area, as an edge closure, there are U-shaped closing strips that are used to form the connections with the neighboring components.

SUMMARY OF THE INVENTION

The object of the invention, on a vehicle cell such as a car body for railway vehicles having roof walls and side walls, each of which includes of wall segments that are connected laterally to one another in the longitudinal direction of the vehicle, whereby door openings are provided in the side walls to adopt measures that make possible, with simple means, an advantageous construction concept in terms of weight, cost and maintenance.

The invention teaches that this object can generally be accomplished by means of the side wall segments that are laterally adjacent to one another having door partial cutouts in their facing vertical edges, and wherein the edges of door partial cutouts that go together and that are at the same level and run into the segment surfaces together have a length, the total of which equals one full door width.

In one configuration of a vehicle cell as claimed by the invention, the seam between neighboring wall segments is moved into the vicinity of the door, which in any case there is an at least a significant vertical separation between neighboring side wall segments. The door partial cutouts that are provided in the vicinity of neighboring wall segments for this purpose must thereby be sized so that the width of the door cutout they form when they are assembled equals the full width of the door. The side wall segments can therefore be directly connected to each other above the door cutout.

Between the vertical side edges of the side wall segments, each of which is provided with a door cutout, window cutouts can be located in locations that are favorable from a static load point of view. However, the side wall segments that are located at the ends of the vehicle cell are thereby provided with door partial cutouts only on their sides that face the respective neighboring side wall segments. The length of the end-position side wall segments preferably equals one-half the length, measured in the longitudinal direction of the vehicle, of a side wall segment that has two door partial cutouts. It thereby becomes possible to have side wall segments and the outer roof walls in the longitudinal direction closed with the end of the vehicle cell, so that a roof segment straddles at least two half side wall segments with the vertical seams located there. By means of a firm connection of the side wall segments with the overlapping roof wall segments, there is sufficient rigidity of the total vehicle cell even in the vicinity of the seams between the individual side wall segments. The joint location between two roof wall segments always lies in the vicinity of the longitudinal center above a side wall segment that is provided with two partial door cutouts. Thus there is an optimal connection in the vicinity of these joint locations between a side wall segment and two roof wall segments that are adjacent to each other in the longitudinal direction.

The wall segments are realized in particular in the form of a sandwich structure with two outer layers and a grid structure that is located in a stationary fashion between them and is made of frame bars that are connected to one another and sandwich cores that are inserted between them. Frame bars are thereby also engaged in the narrow arm of the side wall segment that straddles the door opening, and close its peripheral zones as in the other areas, so that these parts of the frame bars that point outward can also be used to form a strong connection with neighboring components.

So that the frame bars can be connected to one another without any special complexity or expense, joint connectors are provided that are in a plug-type connection with the corresponding ends of the frame bars. Such joint connectors can be provided in corners, at branches or at intersections. The joint connectors can then be equipped with a corresponding number of arms that can be rigidly connected with one another.

To eliminate the presence in the connectors of zones that are subjected to particularly severe loads and to make possible an adjustment to the extensibility of the fiber composite outer layers, as well as for the equalization of manufacturing tolerances, however, it may be appropriate to make the arms of the joint connectors deformable, e.g. to connect them in a hinged manner each to an associated common joint support. The hinged connection can therefore be accomplished, for example, by means of axial bolts or also by means of elastic bands that are realized in one piece with the joint connectors and the joint support, and are made in particular out of elastic material, preferably plastic. Such a sandwich structure can therefore be highly variable as the result of a simple change in the length of the frame bars, and it is also extremely easy to manufacture.

The frame bars and joint connectors as well as the core material are permanently glued to the outer layers when the wall segments are in their final assembled state. At least one of the outer layers can thereby consist of a plurality of layers that are permanently connected to one another, whereby it is appropriate to provide an internal load-bearing layer next to the core material, to which load-bearing layer at least one fire protection layer and/or one decorative layer is firmly attached. It is thereby advantageous if the outer layer, in particular in the inner load-bearing layer, and preferably in the vicinity of corners and at door and/or window cutouts, has fiber inserts that are made of high-strength carbon fibers, while the other areas can be made of a fiber composite, in particular a glass fiber composite material. The corners of these cutouts, which are at increased risk for tears and fractures, are then protected in a suitable manner against tearing and similar forms of damage. In addition, there are simple opportunities for integration of the interior furniture and fixtures, whereby separate thermal insulation and acoustic insulation, as well as smooth inside and outside walls, can be realized by this construction.

The invention is explained in greater detail below with reference to the exemplary embodiment that is illustrated in the accompanying schematic drawings.

DETAILED DESCRIPTION OF THE PREFERRED EMBODIMENT

Figure 1:
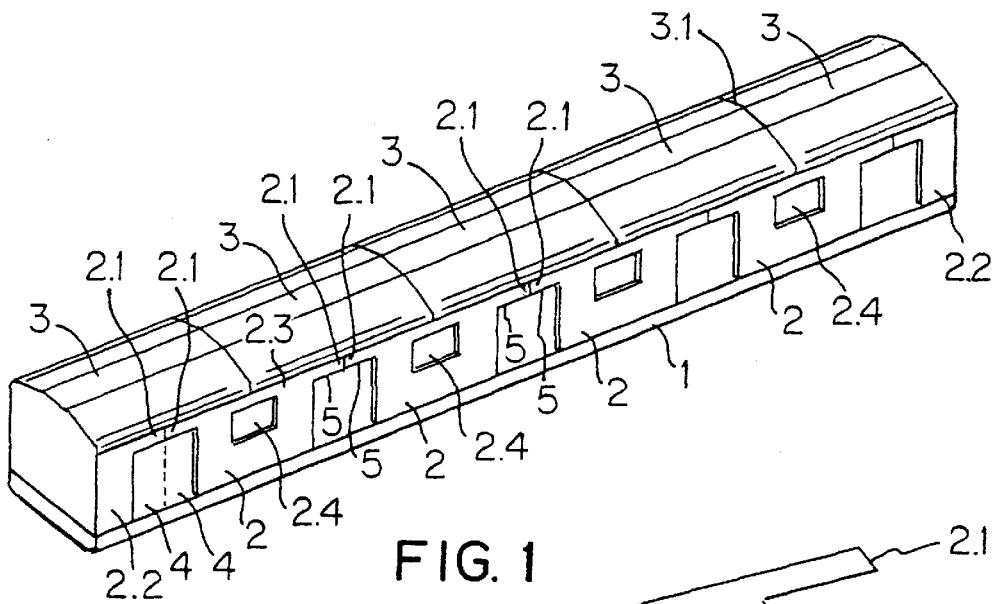
FIG. 1 shows a vehicle cell that consists of a plurality of wall segments that are connected to one another in the longitudinal direction of the vehicle.

As shown in FIG. 1, a vehicle cell is realized in the form of car body for a railway vehicle, in particular a subway car or a streetcar, and is composed of a floor part 1, which is preferably continuous, with side walls that stand vertically on the floor and consist of side wall segments 2, as well as roof wall segments 3 that close the passenger compartment on top. A plurality of side wall segments 2 that are joined together in the longitudinal direction of the vehicle cell thereby form the side walls that stand essentially perpendicular on the floor 1, whereby a plurality of roof wall segments 3 that connect the side walls on top and are also connected to one another in the longitudinal direction of the vehicle cell close the vehicle cell on the periphery in the form of a roof wall. The side wall segments 2, on their lateral edges 2.1 that are laterally adjacent to one another, each have door partial cutouts 4, as shown on the left door in FIG. 1 by a broken vertical line as an extension of the remaining lateral edges 2.1. The remaining segments of the lateral edges 2.1 lie above the door partial cutouts 4, whereby the door partial cutouts 4, starting from the floor 1, do not take up the full height of the side wall segments 2. The edges 5 of the door partial cutouts 4 that start from the lower ends of the remaining lateral edges 2.1 and run into the segment surface of the respective side wall segment 2 in the horizontal direction are located at the same level on neighboring side wall segments 2, and together have a length, measured in the longitudinal direction of the vehicle, the total of which equals one full door width. A strong connection between neighboring side wall segments 2 is therefore necessary only over the short distance of the remaining vertical side edges 2.1. The edges 5 run parallel to the upper longitudinal edge 2.3 of the side wall segments 2.

Figure 2:
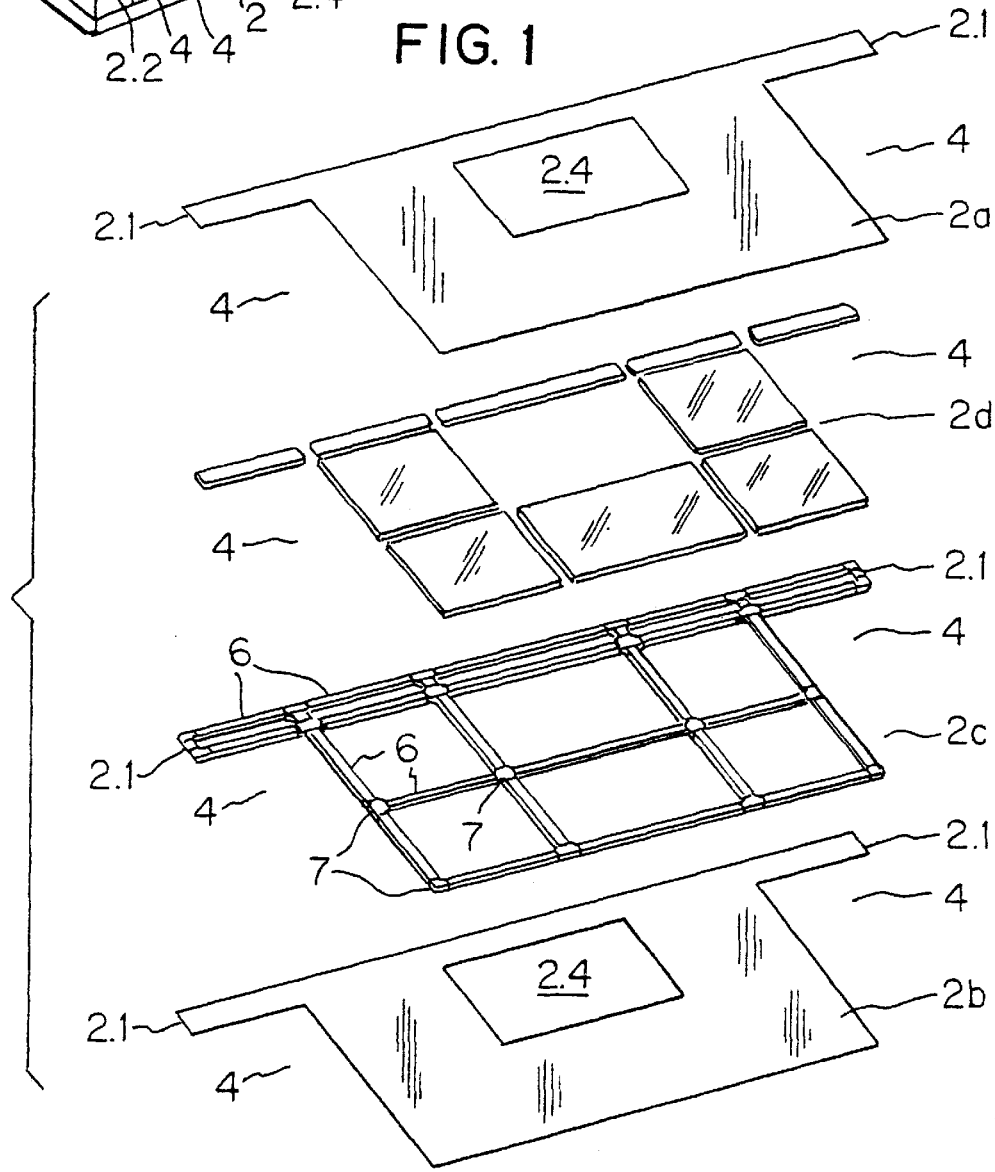
FIG. 2 shows a side wall segment in an exploded view.

The location of the door partial cutouts in the vertical lateral edges of the side wall segments 2, as shown in FIG. 2, makes possible an inherently very stable construction that consists of two outer layers 2a and 2b, between which a grid frame 2c is inserted, which holds between its individual grid bars 6 individual elements of a thermal and/or acoustical insulation and a solid core material 2d that contributes to the overall stability of the design. The outer layers 2a, 2b are thereby firmly connected both with the grid frame 2c and also with the core material 2d, in particular by means of an adhesive connection. In this sandwich structure, between two door partial cutouts 4, at least one full window cutout 2.4 is inserted, which is provided without a disruption of the grid structure between the crossbars 6.

The end-position side wall segments 2.2 that are provided on the respective end of a vehicle cell are only partly as long as the center side wall segments 2, and are also provided with one partial door cutout, which is provided on the vertical lateral edge 2a, which faces an adjacent side wall segment 2. Thus there is a smooth, straight-line end closing of the vehicle cell. This end-position side wall segment 2.2 is thereby preferably fabricated in a length that equals one-half the length of a side wall segment 2 that is provided with two door partial cutouts. As a result, it is possible to form the roof wall from a plurality of roof wall segments 3 that are joined to one another in the longitudinal direction of the vehicle cell, whereby the length of these roof wall segments can equal the length of one side wall segment, or can be as great as two side wall segments 2 that are provided with two door partial openings 4. All the roof wall segments 3 can thereby be realized with the same length. Each long roof wall segment accordingly overlaps, in its center segment, one full side wall segment 2 and on each of its ends overlaps a half side wall segment 2. The result is a stable and reliable connection of the side wall segments 2 by means of the respective roof segment 3, whereby the side wall segment 2 that is located in the vicinity of a joint between two roof segments 3 forms the solid and inherently rigid connection with the next roof segment 3 that is connected with the side wall segments 2. The joint between two roof wall segments 3 therefore lies in the vicinity of the longitudinal center above a side wall segment 2 that is provided with two door partial cutouts.

Figure 3A:
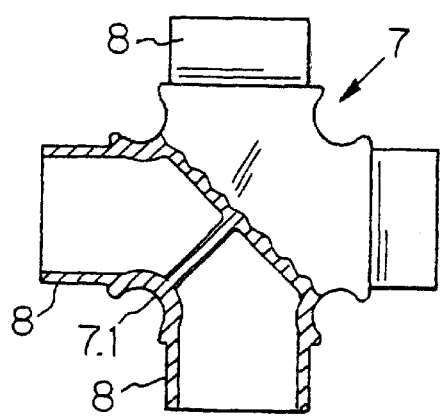
FIGS. 3a and 3b show two variants for a rigid node element.
Figure 3B:
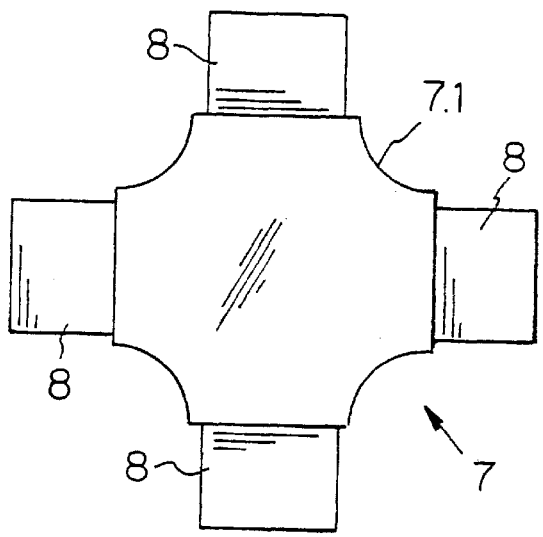
Figure 4:
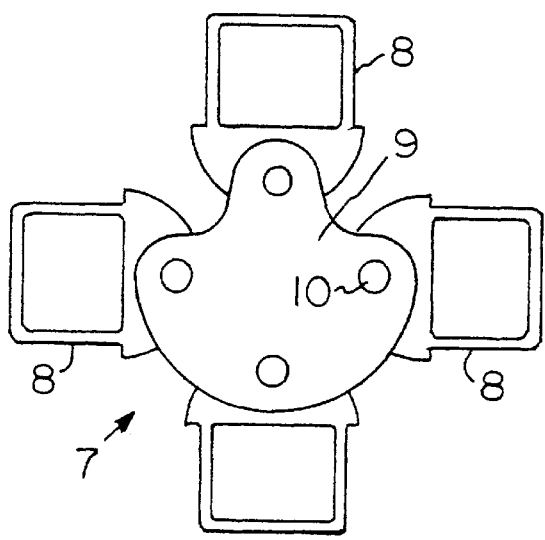
FIG. 4 shows a node element with plug-type arms that can be attached in a hinged manner by means of bearing bolts.
Figure 5:
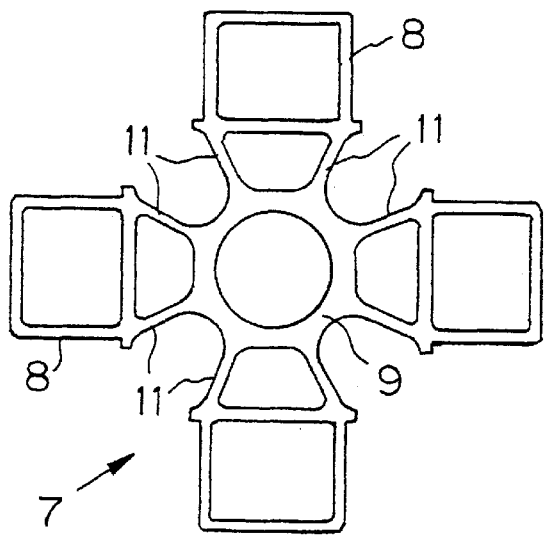
FIG. 5 shows a node element with elastically connected plug-type arms.

To otherwise be able to easily manufacture the wall segments, in particular the side wall segments 2, the individual frame bars 6 are each connected at their connecting points by means of joint connectors 7 with one another by plug-type connectors and possibly also by means of adhesive or riveted connections. The joint connectors 7 thereby have at least two arms 8 that are at an angle to one another, whereby the number of the arms and their orientation to one another is based on the number and orientation of the frame bars that are joined together at the connecting point in question. The frame bars 6 are thereby in particular hollow metal or fiber-reinforced plastic bars, and the arms 8 of the joint connectors 7 are fitted so that they match their inside cross section, as a result of which plug-in connections are created. The arms 8 can be rigidly connected with one another as shown in FIGS. 3a and 3b. In this case, to reduce the high mechanical stresses in the corners 7.1, there are greater material thicknesses or accumulations of material in said corners (FIG. 3a), or the transition radius between two arms 8 and the area of thicker material is realized so that the transition radius is appropriately large (FIG. 3b). It is also possible, however, to connect at least individual arms of a joint connector 7 with a joint support 9 in a hinged manner, as shown in FIGS. 4 and 5. As shown in FIG. 4, the individual arms 8 are thereby hinged by means of bearing bolts 10 to a node support 9, while as shown in FIG. 5 they are connected to the central node support 9 by means of elastic bands 11. It is then possible to achieve some degree of compensation for tolerances between associated grid bars 6 or to connect grid bars at an acute angle to each other by means of the joint connectors 7. The joint connectors 7 can thereby be connected firmly with the grid bars, in particular by means of an adhesive connection in the vicinity of the plug-type connecting points, and can be plugged into each other in the plane defined by the grid bars. The cover layers 2a, 2b and the joint connectors 7 can thereby be glued to one another over their entire surface, and thus form an inherently rigid sandwich structure. The outer layers 2a and 2b can thereby consist in particular of a plurality of layers that are firmly connected with one another, whereby the layer attached to the grid structure 6, 7 on the inboard side of the vehicle is a load-bearing layer with high mechanical stability, on which a fire protection coating and/or a decorative coating can be applied. It is thereby appropriate to provide the outer layers 2a, 2b, in particular in corners or door and/or window cutouts 4, 2.4, with fiber inserts that are made of high-strength carbon fibers, while the other areas are bonded with glass or other fibers. The installation of high-strength fibers in the corner regions can thereby be limited to the load-bearing layer, to reduce the danger of cracking in the corner areas.

The load-bearing layers in the corners of the door and/or window cutouts can also be connected with the frame bars and the nodes, in addition to the connection by means of adhesive, by bolts, whereby the bolts are preferably oriented so that they also secure the frame bars in the nodes.

What is claimed is:

1. A vehicle cell for railway vehicles, comprising:
   roof walls and side walls, each of which includes wall segments that are connected laterally to one another in the longitudinal direction of the vehicle; and
   a door opening having a width provided in at least two side wall segments,
   wherein two side wall segments are end-position side wall segments, each having at only one end a vertical edge with a cutout in the edge, wherein the cutout is a portion of the door opening;
   wherein at least one side wall segment is an intermediate-position side wall segment and has two ends and a length, wherein each end has a vertical edge with a cutout in the edge, wherein the cutout is in the shape of a portion of the door opening;
   and wherein each end-wall side wall segment is laterally adjacent to one intermediate-position side wall segment and the adjacent edges of the door cutouts go together, are at the same level and wherein the two cutouts when combined have a length in the longitudinal direction equal to the width of the door.

2. The vehicle cell as claimed in claim 1, wherein the partial cutouts are positioned below the upper longitudinal edge of the corresponding wall segment.

3. The vehicle cell as claimed in claim 2, including at least one full window cutout in a wall segment between two door cutouts.

4. The vehicle cell as claimed in claim 2, wherein at least one side wall has an outer layer which includes a plurality of sublayers that are firmly connected to one another.

5. The vehicle cell as claimed in claim 4, wherein arms of the joint connectors are connected in a hinged manner to a common joint support.

6. The vehicle cell as claimed in claim 1, wherein each side wall segment has a length and wherein the end-position side wall segment is no longer than one-half the length of an intermediate-position side wall segment.

7. The vehicle cell as claimed in claim 1, wherein the roof wall includes a plurality of roof wall segments, each having a length, that are joined together in the longitudinal direction of the vehicle, the combined length of which two roof wall segments is twice as great as the length of a side wall segment that is provided with two door partial openings.

8. The vehicle cell as claimed in claim 7, wherein the joint between two roof wall segments lies in the vicinity above a side wall segment that is provided with two door cutouts and midway along the length of the intermediate-position wall segment.

9. The vehicle cell as claimed in claim 1, wherein the wall segments have a sandwich structure with two outer layers and a grid structure located in a stationary fashion between them that includes frame bars that are connected to one another and inserted insulating cores, and frame bars are located along the outside edges and are connected to each other above the door cutouts.

10. The vehicle cell as claimed in claim 9, wherein between the individual frame bars, joint connectors are inserted at joint locations with adjacent frame bars.

11. The vehicle cell as claimed in claim 10, wherein the joint connectors have at least two arms that project at an angle to one another and are plugged into the ends of corresponding frame bars.

12. The vehicle cell as claimed in claim 11, wherein arms of the joint connectors are rigidly connected to one another.

13. The vehicle cell as claimed in claim 10 wherein arms of the joint connectors are rigidly connected to one another.

14. The vehicle cell as claimed in claim 10, wherein arms of the joint connectors are connected in a hinged manner to a common joint support.

15. The vehicle cell as claimed in claim 14, wherein arms are connected by means of elastic bands to a common joint support.

16. The vehicle cell as claimed in claim 9, wherein the outer layer has an internal load-bearing layer, on which at least one fire protection and/or decorative layer is applied.

17. The vehicle cell as claimed in claim 9, wherein the outer layer, in the corners of door and window cutouts, has fiber inserts that are made of carbon fibers.

18. The vehicle cell as claimed in claim 9, wherein the outer layers are connected in the corners of door and/or window cutouts by means of both adhesive connections and by means of bolts with frame bars and the nodes, whereby the bolts are preferably oriented so that they also secure the frame bars in the nodes.

19. The vehicle cell as claimed in claim 9, wherein the outer layer, in the corners of door or window cutouts, has fiber inserts that are made of carbon fibers.

20. The vehicle cell as claimed in claim 9, wherein the outer layer consists of a plurality of layers that are firmly connected to one another.

* * * * *